(12) United States Patent
Ohkubo et al.

(10) Patent No.: US 12,492,069 B2
(45) Date of Patent: Dec. 9, 2025

(54) CONTAINER

(71) Applicant: Akimoto Seisakusyo Co., Ltd., Kashiwa (JP)

(72) Inventors: Masanori Ohkubo, Kashiwa (JP); Kazumasa Yamazaki, Noda (JP)

(73) Assignee: Akimoto Seisakusyo Co., Ltd., Kashiwa (JP)

(*) Notice: Subject to any disclaimer, the term of this patent is extended or adjusted under 35 U.S.C. 154(b) by 1077 days.

(21) Appl. No.: 17/605,903

(22) PCT Filed: Aug. 27, 2020

(86) PCT No.: PCT/JP2020/032391
§ 371 (c)(1),
(2) Date: Oct. 22, 2021

(87) PCT Pub. No.: WO2022/044208
PCT Pub. Date: Mar. 3, 2022

(65) Prior Publication Data
US 2022/0306374 A1    Sep. 29, 2022

(51) Int. Cl.
*C09K 3/16* (2006.01)
*B65D 1/36* (2006.01)
*B65D 85/68* (2006.01)

(52) U.S. Cl.
CPC .............. *B65D 85/68* (2013.01); *B65D 1/36* (2013.01); *C09K 3/16* (2013.01); *B65D 2585/86* (2013.01)

(58) Field of Classification Search
CPC ...... B65D 85/68; B65D 1/36; B65D 2585/86; C09K 3/16; H01L 2221/68313; H01L 21/6835; H01L 21/00
See application file for complete search history.

(56) References Cited

U.S. PATENT DOCUMENTS

| | | | |
|---|---|---|---|
| 9,010,953 B1* | 4/2015 | Wells | A47G 19/2272 362/101 |
| 2013/0102710 A1* | 4/2013 | Noda | C08L 53/00 524/106 |
| 2020/0200611 A1* | 6/2020 | Praharaj | B32B 3/12 |

FOREIGN PATENT DOCUMENTS

| | | | |
|---|---|---|---|
| JP | 61-59242 A | | 3/1986 |
| JP | 04246461 A | * | 9/1992 |
| JP | 5-16984 A | | 1/1993 |
| JP | 7-228765 A | | 8/1995 |
| JP | 2005-88995 A | | 4/2005 |
| JP | 2007285930 A | * | 11/2007 |
| JP | 2007320590 A | * | 12/2007 |
| JP | 2010-229348 A | | 10/2010 |
| JP | 2012-31395 A | | 2/2012 |
| JP | 2012-202695 A | | 10/2012 |

OTHER PUBLICATIONS

International Search Report issued on Nov. 10, 2020 in PCT/JP2020/032391 filed on Aug. 27, 2020, 2 pages.

* cited by examiner

*Primary Examiner* — Kumar R Bhushan
(74) *Attorney, Agent, or Firm* — Merchant & Gould P.C.; Daniel J. Pereira

(57) ABSTRACT

A method in which a storage container composed of a resin and an antistatic agent is assessed for suitability of storing an electric product by visually inspection of the container such that discoloration induced by heating is correlative to surface electric resistance.

14 Claims, 1 Drawing Sheet

CONTAINER

CROSS REFERENCE TO RELATED APPLICATION

This application is a national stage entry under 35 USC 371 of PCT/JP2020/032391, which was filed on Aug. 27, 2020.

TECHNICAL FIELD

The present invention relates to a container. The present invention relates to a container (also referred to as "tray") to be used for, for example, safekeeping of electric products (e.g., semiconductor devices (transistors, ICs, etc.) and other electronic parts), transporting of such electric products, or setting of such electric products to a mounting apparatus (or inspection apparatus) and the like. More specifically, the present invention relates to a container capable of storing many electric products therein side by side.

BACKGROUND ART

In a case where electronic parts are transported, in a manufacturing process, from a process A to the next process B and in a case where electronic parts are set to a characteristic inspection apparatus (or an automatic mounting apparatus), the electronic parts are stored in a synthetic resin-made tray having a plurality of electronic parts-housing chamber. JP1993-16984A (PATENT LITERATURE 1) discloses an example of the tray. FIG. 1 is a perspective view illustrating a state that a plurality of the trays is stacked together. FIG. 2 is a cross-sectional view of FIG. 1 taken along the line I-I. In FIG. 1 and FIG. 2, 1 denotes a tray, 2 denotes a product (part) housing chamber, 3 denotes a convex rim, 4 denotes a concave rim, and 6 denotes an electronic part (see PATENT LITERATURE 1). JP2005-88995A (PATENT LITERATURE 2) discloses an example of the tray. FIG. 3 is a plane view of a tray. This tray also may be used in such a manner that a plurality of trays is stacked together. In FIG. 3, 1 denotes a try, 2 denotes a product housing chamber, 3 denotes a convex rim, and 4 denotes a protrusion (see PATENT LITERATURE 2).

In a case where a case for electric products is made of a resin, a problem of dust sticking caused by generation of static electricity (electrification) is pointed out. A problem of malfunction caused by electrical discharge is also pointed out. JP1992-246461A (PATENT LITERATURE 3), JP1995-228765A (PATENT LITERATURE 4), JP2010-229348A (PATENT LITERATURE 5), and JP2012-31395A (PATENT LITERATURE 6) propose to form the case by using an antistatic resin. They propose to form the case by using an antistatic agent-containing resin composition. The PATENT LITERATURES 3, 4, and 5 propose to use a polyphenylene ether (PPE) based resin as a constituent material for forming the case. As the antistatic agent, a conductive filler (carbon black (CP), carbon fiber (CF), metal powder, and metal fiber), a surfactant having an antistatic function, a polymer type resin-made antistatic agent, etc. are known. In a case where the case is formed of the antistatic agent-containing resin composition, it is said that the problem of generation of static electricity (electrification) is improved.

CITATION LIST

Patent Literature

[Patent Literature 1]
JP1993-16984A

[Patent Literature 2]
JP2005-88995A
[Patent Literature 3]
JP1992-246461A
[Patent Literature 4]
JP1995-228765A
[Patent Literature 5]
JP2010-229348A
[Patent Literature 6]
JP2012-31395A

SUMMARY OF INVENTION

Technical Problem

In a case of transporting electronic parts from a process A to the next process B in a manufacturing process by storing the electronic parts in a tray (like the trays illustrated in FIG. 1 and FIG. 3) formed of a carbon black-containing resin composition (alternatively, in a case of inspecting characteristics of electronic parts by setting the electronic parts to a characteristic inspection apparatus, or in a case of mounting electronic parts by setting the electronic parts to an automatic mounting apparatus), a problem was found as time passes (as an operation progresses) even when no problem has been found in an early stage. Namely, carbon black in the resin composition constituting the tray leaked out to a tray surface. This phenomenon is referred to as "powder fall of carbon black". The leaked carbon black adhered to electronic parts. The adhered carbon black can be removed by detergency. The detergency, however, takes time and labor. The detergency may cause inconvenience to the electronic parts. A drying process becomes essential after the liquid detergency. In a case where carbon fiber is used, the carbon fiber may protrude from the tray surface. In this case, the protruding carbon fiber may cause a damage to a metal-made terminal of the electronic parts. Another problem may occur, namely, the protruding carbon fiber is broken to adhere to the tray surface and further adhere to the electronic parts. The carbon black and the carbon fiber are black. This makes the outer appearance of the carbon black (or carbon fiber) containing resin-made tray degraded.

Instead of the conductive material (carbon black or carbon fiber), the use of a surfactant was considered. In the tray formed of a surfactant containing-resin composition, the problem which occurred when the tray was formed of the carbon black (or carbon fiber) containing-resin composition was improved. The surfactant, however, is easy to ooze out to the tray surface (bleeding-out phenomena). Therefore, if a surfactant containing resin-made tray is used for a long time, the surfactant adheres to the electronic parts stored in the tray. This may invite inconvenience to the electronic parts.

A purpose of the present invention is to solve the above-described problem (i.e., inconvenience occurred to the electronic parts stored in the tray which has been used for along time).

Solution to Problem

Initially, nobody noticed at all that the inconvenience occurred to the electronic parts resulted from the tray. As to an exchange of the tray, the exchange was performed only when the tray was deteriorated. While the tray was new (e.g., in the early stage of the use of the tray), there was no problem found with the electronic parts stored in the tray. Therefore, the inventors finally made a conjecture that the problem might occur because of the long term-use of the tray. The inventors considered that the exchange of the tray to a new one would work.

The inventors have conducted further intensive studies. The inventors came to have such a conjecture that an antistatic agent in the tray constituent material (antistatic agent-containing resin composition) came out (leaked out; oozed out) from the material (the resin composition) with the lapse of time, resulting in inviting the problem. The inventors aimed at development of an antistatic agent which hardly oozes out from the resin composition. The development in this way, however, was not easy.

The inventors changed the way to go. The inventors considered that, in a case where the antistatic agent oozed out from the constituent material (antistatic agent-containing resin composition) of the tray to thereby cause degradation of the antistatic performance of the tray, the tray whose antistatic performance has degraded only needed to be exchanged to a new tray (a tray having a good antistatic performance).

The point is when is the right time to exchange the tray. It is too late to exchange the tray after the inconvenience to the electronic parts stored in the tray is found. Studying as to when the tray is to be exchanged has not been made to date.

A time (timing) at which the tray in use is to be exchanged to a new one needs to be examined. But there was no idea what was to be focused on for determining the exchange timing. It is, off course, very convenient if the exchange timing can be known at ease.

The inventors studied as to what imposed a bad influence on the products (specially, on the electric products) stored in the tray. The inventors, on their way of study, came to have an idea that the bad influence would be the surface electric resistance of the tray. The inventors found that the exchange timing should be a time at which a surface electric resistance value of the tray showed considerable deterioration (increase) (more specifically, a time before the surface electric resistance increased considerably). It is not easy to measure the surface electric resistance value of the tray. It is hard to keep measuring (to perform continuous measurement of) the surface electric resistance value. It will be impossible to keep measuring the surface electric resistance value of the tray during the transportation (or during the characteristic inspection, or during mounting) of the electronic parts. If the continuous measurement is impossible, a time at which the surface electric resistance value is to be measured must be determined. It is, however, unknown.

The inventors continuously studied about what was to be investigated to solve the problem. Specifically, the inventors proceeded with the examination about what was to be investigated for the sake of noticing the deterioration (increase) of the surface electric resistance without using a special measurement apparatus. The inventors proceeded with such an examination that, by what information we could obtain, we could know the surface electric resistance characteristics even without measuring the surface electric resistance value. As a result, it came to understand that there was a close relationship between a color of the tray and the surface electric resistance characteristic of the tray. It is reasonable to consider that a time when the tray is discolored is a time at which the electrostatic characteristic (surface electric resistance) of the tray might have changed. It can be so considered that discoloration of the tray shows a change in quality of a material (resin) of the tray. It will not be a surprising idea that, because the resin changes in quality, an antistatic agent contained in the material (resin) oozes out.

This can mean that the discoloration of the tray shows the change of the surface electric resistance of the tray. The inventors considered that the exchange timing of the tray could be judged (determined) based on the discoloration of the tray, the discoloration being caused by heating. The inventors considered that, in a case where the discoloration of the tray (or resin composition) was found, the surface electric resistance of the tray changed according to a degree of the discoloration. As a result, the inventors considered that the exchange timing of the tray could be judged (determined) according to the degree of the discoloration (change in color).

The inventors heated a resin composition-made plate constituting the tray to thereby investigate a relationship between a change of the surface electric resistance value of the plate and a change in color of the plate. As a result, the inventors found that the discoloration of the plate and the surface electric resistance characteristics of the plate linked each other. The inventors thought that the change of the surface electric resistance value of the tray corresponded to the change in color of the tray (namely, the inventors considered that a time when the tray color became a defined color was a time when the surface electric resistance value of the tray reached a threshold). The inventors had an idea that this could contribute to judgement of the exchange timing of the tray. In this case, no special apparatus is required. The change can be judged visually.

The present invention was achieved based on the above-described knowledge.

The present invention proposes a method for judging a time at which a container is to be exchanged to another container:
wherein the container has a storage section for storing products;
wherein a constituent material of the container is a resin composition;
wherein the composition contains an antistatic agent;
wherein the composition
contains no coloring material, or
contains a coloring material, however in this case, at a time when (a surface electric resistance value of the container having been changed by heating of the container) is ten times of (a surface electric resistance value of the container at a time of starting the heating), discoloration of the container caused by the heating is a recognizable degree; and
wherein an exchange timing of the container is judged according to a color of the container discolored by the heating.

The present invention proposes a method for exchanging a container to another container:
wherein the container has a storage section for storing products;
wherein a constituent material of the container is a resin composition;
wherein the composition contains an antistatic agent;
wherein the composition
contains no coloring material, or
contains a coloring material, however in this case, at a time when (a surface electric resistance value of the container having been changed by heating of the container) is ten times of (a surface electric resistance value of the container at a time of starting the heating), discoloration of the container caused by the heating is a recognizable degree; and
wherein the container is exchanged in a case where a color of the container discolored by the heating is a defined color.

The present invention proposes the method, wherein the method is used when transporting the products stored in the container, when inspecting characteristics of the products stored in the container, or when mounting the products stored in the container. The present invention proposes the method, wherein the method is used when transporting the products stored in the container along with heating, when inspecting characteristics of the products stored in the container along with heating, or when mounting the products stored in the container along with heating.

The present invention proposes the method:
wherein the method is used when transporting the products stored in the container, when inspecting characteristics of the products stored in the container, or when mounting the products stored in the container; and
wherein, at a time when (a surface electric resistance value of the container having been changed by heating of the container)/(a surface electric resistance value of the container at a time of starting the heating)≤10, discoloration of the container caused by the heating is recognizable.

The present invention proposes the method, wherein the discoloration results from discoloration of the resin caused by the heating.

The present invention proposes the method, wherein the products are electric products.

The present invention proposes the method, wherein the composition contains substantially no carbon black and no carbon fiber.

The present invention proposes the method, wherein a polyphenylene ether-based resin is used as the resin.

The present invention proposes the method, wherein a styrenic resin is further used as the resin.

The present invention proposes the method, wherein the styrenic resin is an acrylonitrile-styrenic resin.

The present invention proposes the method, wherein the styrenic resin is contained in an amount of from 4 pts·mass to 70 pts·mass with respect to the polyphenylene ether-based resin of 100 pts·mass.

The present invention proposes the method, wherein the antistatic agent is a surfactant.

The present invention proposes the method, wherein the antistatic agent is a polymer type antistatic agent.

The present invention proposes a container having an electric product storage part:
wherein the container is formed by using a resin composition;
wherein the composition contains an antistatic agent;
wherein the composition
contains no coloring material, or
contains a coloring material, however in this case, at a time when (a surface electric resistance value of the container having been changed by heating of the container) is ten times of (a surface electric resistance value of the container at a time of starting the heating), discoloration of the container caused by the heating is a recognizable degree; and
wherein the composition contains substantially no carbon black and no carbon fiber.

The present invention proposes a container having an electric product storage part:
wherein the container is formed by using a resin composition;
wherein the composition contains an antistatic agent;
wherein at least a polyphenylene ether-based resin and a styrenic resin are used as the resin; and
wherein the composition contains substantially no carbon black and no carbon fiber.

The present invention proposes a container having an electric product storage part:
wherein the container
satisfies, when heated at 135° C. in the air, (a surface electric resistance value of the container having been changed by heating of the container)/(a surface electric resistance value of the container at a time of starting the heating)≤10 up to a lapse of 288 hours from the time of starting the heating; and
satisfies, when heated at 150° C. in the air, (a surface electric resistance value of the container having been changed by heating of the container)/(a surface electric resistance value of the container at a time of starting the heating)≤10 up to a lapse of 192 hours from the time of starting the heating;
wherein the container is formed by using a resin composition;
wherein the resin composition contains an antistatic agent;
wherein at least a polyphenylene ether-based resin is used as the resin;
wherein the resin composition
contains no coloring material, or
contains a coloring material, however in this case, at a time when (a surface electric resistance value of the container having been changed by heating of the container) is ten times of (a surface electric resistance value of the container at a time of starting the heating), discoloration of the container caused by the heating is a recognizable degree; and
wherein the resin composition contains substantially no carbon black and no carbon fiber.

The present invention proposes a container having an electric product storage part:
wherein the container
satisfies, when heated at 135° C. in the air, (a surface electric resistance value of the container having been changed by heating of the container)/(a surface electric resistance value of the container at a time of starting the heating)≤10 up to a lapse of 288 hours from the time of starting the heating; and
satisfies, when heated at 150° C. in the air, (a surface electric resistance value of the container having been changed by heating of the container)/(a surface electric resistance value of the container at a time of starting the heating)≤10 up to a lapse of 192 hours from the time of starting the heating;
wherein the container is formed by using a resin composition;
wherein the resin composition contains an antistatic agent;
wherein at least a polyphenylene ether-based resin and a styrenic resin are used as the resin;
wherein the resin composition
contains no coloring material, or
contains a coloring material, however in this case, at a time when (a surface electric resistance value of the container having been changed by heating of the container) is ten times of (a surface electric resistance value of the container at a time of starting the heating), discoloration of the container caused by the heating is a recognizable degree; and
wherein the resin composition contains substantially no carbon black and no carbon fiber.

The present invention proposes a container having an electric product storage part:

wherein the container
satisfies, when heated at 135° C. in the air, (a surface electric resistance value of the container having been changed by heating of the container)/(a surface electric resistance value of the container at a time of starting the heating)≤10 up to a lapse of 288 hours from the time of starting the heating; and
satisfies, when heated at 150° C. in the air, (a surface electric resistance value of the container having been changed by heating of the container)/(a surface electric resistance value of the container at a time of starting the heating)≤10 up to a lapse of 192 hours from the time of starting the heating;
wherein the container is formed by using a resin composition;
wherein the resin composition contains an antistatic agent;
wherein at least a polyphenylene ether-based resin and a styrenic resin are used as the resin;
wherein the styrenic resin is an acrylonitrile-styrenic resin;
wherein the resin composition
contains no coloring material, or
contains a coloring material, however in this case, at a time when (a surface electric resistance value of the container having been changed by heating of the container) is ten times of (a surface electric resistance value of the container at a time of starting the heating), discoloration of the container caused by the heating is a recognizable degree; and
wherein the resin composition contains substantially no carbon black and no carbon fiber.

The present invention proposes the container, wherein the styrenic resin is contained in an amount of from 4 pts·mass to 70 pts·mass with respect to the polyphenylene ether-based resin of 100 pts·mass.

The present invention proposes the container, wherein the antistatic agent is a polymer type antistatic agent.

The present invention proposes the container:
wherein the container is used when transporting the products stored in the container, when inspecting characteristics of the products stored in the container, or when mounting the products stored in the container; and
wherein, at a time when (a surface electric resistance value of the container having been changed by heating of the container)/(a surface electric resistance value of the container at a time of starting the heating)≤10, discoloration of the container caused by the heating is visually recognizable.

Advantageous Effect of Invention

A container in use can be easily exchanged with a new container (i.e., a container good in an antistatic function). An exchange timing of the container can be judged by a visual observation. By exchanging the container in use to a new container, a problem occurred to the products in the container was improved.

DESCRIPTION OF EMBODIMENTS

Figure 1:
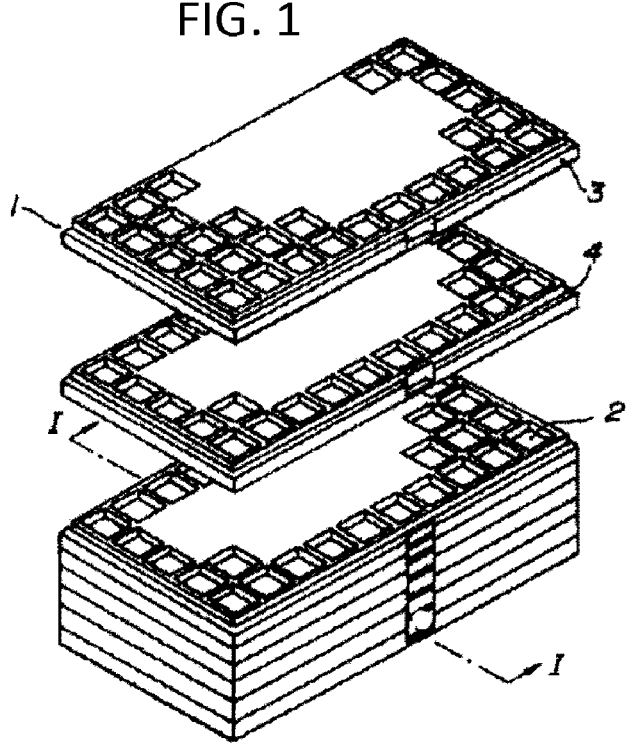
FIG. 1 is a perspective view illustrating a state that a plurality of trays (containers) is stacked together.
Figure 2:
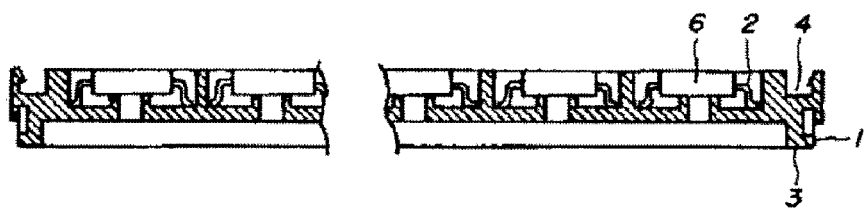
FIG. 2 is a cross-sectional view of FIG. 1 taken along the line I-I.
Figure 3:
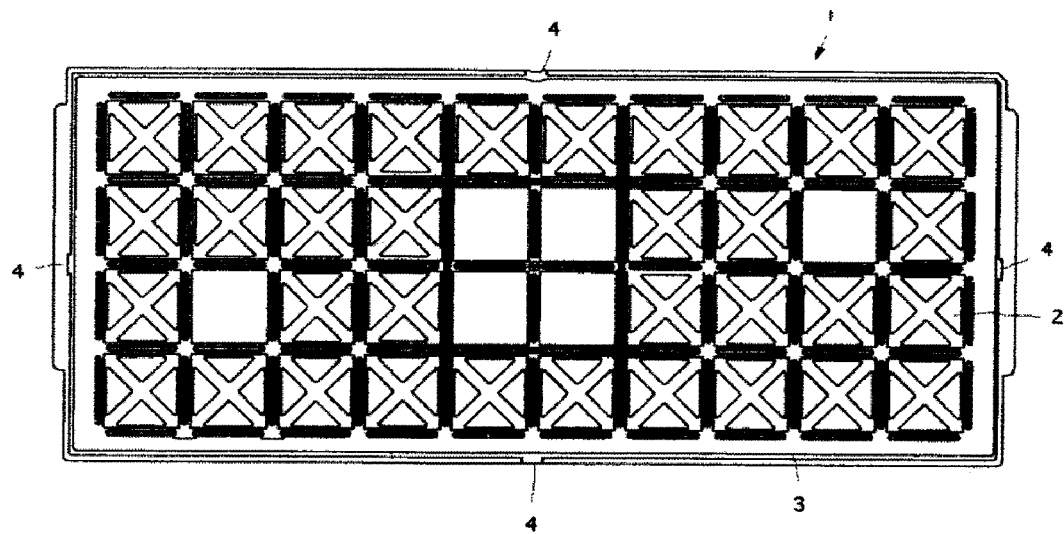
FIG. 3 is a plane view illustrating a tray (container) of a type different from the tray of FIG. 1.

The first invention is directed to a method. The method is a method for judging a time for exchanging a container to another container (e.g., a new container). Specially, the method is a method capable of judging the exchange timing by a visual observation. Another container may be a used container (a container after several use). The container for exchange may be any container in good condition. The container has a storage section for storing products. The constituent material of the container is a resin composition. The composition contains an antistatic agent. The composition contains no coloring material. Even in a case where the composition contains a coloring material, the following degree will be acceptable. For example, at the time when {(a surface electric resistance value of the container having been changed by heating of the container)/(a surface electric resistance value of the container at a time of starting the heating)}=10, discoloration of the container caused by the heating is a recognizable degree. Preferably, in a case where {(a surface electric resistance value of the container having been changed by heating of the container)/(a surface electric resistance value of the container at a time of starting the heating)}≤10, discoloration of the container caused by the heating is a recognizable degree. If the composition contains no colorant, the color (color after the discoloration) can be visually recognized when the container (the resin composition) is discolored by the heating. Even if the composition contains a colorant, in so far as the above-described condition is satisfied, the color (color after the discoloration) can be visually recognized, under such condition, when the container (the resin composition) is discolored by the heating. The container is formed by using the resin composition. The container has a shape (structure) of, for example, the shapes (structures) shown in FIG. 1 and FIG. 3. The shape (structure) is, of course, not limited to those shown in FIG. 1 and FIG. 3. An exchange timing of the container is judged (determined) according to a color of the container having been discolored by the heating. A time when the container is discolored by the heating and becomes a defined color (a predetermined color) is considered as a time when a surface electric resistance value of the container reaches a threshold (a surface electric resistance value more than a certain value), and thus it is judged (determined) that this is the time for exchanging the container to another container. The discoloration (defined color) of the container by which the exchange timing of the container is determined is decided in the following manner. A substrate formed of a resin composition is prepared, the composition being the same one as constituting the container. The substrate is heated to a temperature at which the container is used. The substrate is kept at the temperature for X hours. When a color of the substrate is discolored as the time passes at the temperature, a surface electric resistance value of the substrate is measured. The measurement operation is repeated until the surface electric resistance value becomes a large value, namely, W times of (a surface electric resistance value at a time of starting the heating) (W=10. In some case, 9, or, 8, 7, or 6). The discoloration (color) of the substrate at the time when {(a surface electric resistance value of the container having been changed by heating of the container)/(a surface electric resistance value of the container at a time of starting the heating)} becomes 10 (In some case, 9, or, 8, 7, or 6) is observed. The observed color is a defined color [a color for judging (determining) an exchange timing of the container: a predetermined color].

A second invention is directed to a method. The method is a method for exchanging a container to another container (e.g., a new container). The container used in this method is the same container as described in the judging method. In a case where a color of the container having been discolored by heating is a defined color, the container is exchanged. For example, the exchange is performed according to the judging method.

The method is performed, for example, when transporting the products stored in the container. The method is performed, for example, when transporting the products stored in the container along with heating. The method is performed, for example, when inspecting characteristics of the products stored in the container. The method is performed, for example, when inspecting characteristics of the products stored in the container along with heating. The method is performed, for example, when mounting the products stored in the container. The method is performed, for example, when mounting the products stored in the container along with heating. In the present description, "along with heating" is used to mean "a temperature is kept at a certain temperature". In the above exemplified embodiments, at a time when (a surface electric resistance value of the container having been changed by heating of the container)/(a surface electric resistance value of the container at a time of starting the heating)≤10, a color of the container discolored by the heating is recognizable. This is because of the following reason. For example, when inspecting characteristics of the products, the products are generally placed under a heating condition. As the heating time becomes longer, the resin changes (deteriorates) more in quality. As the resin changes (deteriorates) in quality, an antistatic agent oozes out from the resin. A surface electric resistance becomes larger. When inspecting characteristics, it will be preferred that no fluctuation of the surface electric resistance of the container occurs. This is because, if the measurement condition fluctuates, a reasonable comparison of the obtained characteristic values cannot be performed. Therefore, the inspection should be performed under the same measurement condition. For example, it is preferable that the surface electric resistance values of containers in which products are stored are the same. According to the study performed by the present inventors, in a case where the surface electric resistance values fluctuate within a range from $1.0 \times 10^n$ to $1.0 \times 10^{n+1}$, it comes to be known that there is only a little problem in comparing the characteristic values. Therefore, if it is preliminary known that, at what color of the container discolored by the heating, {(a surface electric resistance value of the container having been changed by heating of the container)/(a surface electric resistance value of the container at a time of starting the heating)}>10 is satisfied, the better time to stop using the container storing the products can be known. This means that, at the time when {(a surface electric resistance value of the container having been changed by heating of the container)/(a surface electric resistance value of the container at a time of starting the heating)}≤10, a color of the container having been discolored by the heating only needs to be recognizable. At a time when {(a surface electric resistance value of the container having been changed by heating of the container)/(a surface electric resistance value of the container at a time of starting the heating)} is, for example, 9 (or 8, 7, or 6), also, a color of the container having been discolored by the heating only needs to be recognizable. This is because, the change of the surface electric resistance is smaller at the time when {(a surface electric resistance value of the container having been changed by heating of the container)/(a surface electric resistance value of the container at a time of starting the heating)} is 9 (8, 7, or 6) than the time when it is 10.

A third invention is directed to a container. The container has an electric product storage part. The container has a shape (structure) as described above. The container is formed by using a resin composition. The composition contains an antistatic agent. The antistatic agent was, preferably, a polymer type antistatic agent. The composition contains no coloring material. The composition contains a coloring material, however in this case, at a time when (a surface electric resistance value of the container having been changed by heating of the container)/(a surface electric resistance value of the container at a time of starting the heating)=10, a color of the container having been discolored by the heating only needs to be recognizable. Preferably, at a time when (a surface electric resistance value of the container having been changed by heating of the container)/(a surface electric resistance value of the container at a time of starting the heating)≤10, a color of the container having been discolored by the heating only needs to be recognizable. The composition contains substantially no carbon black and no carbon fiber. The container is a container to be used, for example, when transporting the products stored in the container, when inspecting characteristics of the products stored in the container, or when mounting the products stored in the container. The container is a container to be used, for example, when transporting the products stored in the container along with heating, when inspecting characteristics of the products stored in the container along with heating, or when mounting the products stored in the container along with heating.

A fourth invention is directed to a container. The container has an electric product storage part. The container has a shape (structure) as described above. The container is formed by using a resin composition. The composition contains an antistatic agent. The antistatic agent was, preferably, a polymer type antistatic agent. At least a polyphenylene ether-based resin is used as the resin. Preferably, the polyphenylene ether-based resin and the styrenic resin are used. The styrenic resin was, preferably, an acrylonitrile-styrenic resin. The composition contains no coloring material. The composition contains a coloring material, however in this case, at a time when (a surface electric resistance value of the container having been changed by heating of the container)/(a surface electric resistance value of the container at a time of starting the heating)=10, a color of the container having been discolored by the heating only needs to be recognizable. Preferably, at the time when (a surface electric resistance value of the container having been changed by heating of the container)/(a surface electric resistance value of the container at a time of starting the heating)≤10, a color of the container having been discolored by the heating only needs to be recognizable. The composition contains substantially no carbon black and no carbon fiber. The container is a container to be used, for example, when transporting the products stored in the container, when inspecting characteristics of the products stored in the container, or when mounting the products stored in the container. The container is a container to be used, for example, when transporting the products stored in the container along with heating, when inspecting characteristics of the products stored in the container along with heating, or when mounting the products stored in the container along with heating.

A fifth invention is directed to a container. The container has an electric product storage part. The container has a shape (structure) as described above. The container is formed by using a resin composition. The composition contains an antistatic agent. The antistatic agent was, preferably, a polymer type antistatic agent. At least a polyphenylene ether-based resin is used as the resin. Preferably, a polyphenylene ether-based resin and a styrenic resin are used. The styrenic resin is, preferably, an acrylonitrile-styrenic resin.

The composition contains no coloring material. The composition contains a coloring material, however in this case, at a time when (a surface electric resistance value of the container having been changed by heating of the container)/(a surface electric resistance value of the container at a time of starting the heating)=10, a color of the container having been discolored by the heating only needs to be recognizable. Preferably, at a time when (a surface electric resistance value of the container having been changed by heating of the container)/(a surface electric resistance value of the container at a time of starting the heating)≤10, a color of the container having been discolored by the heating only needs to be recognizable. The composition contains substantially no carbon black and no carbon fiber. The container is a container, when heated at 135° C. in the air, satisfying (a surface electric resistance value of the container having been changed by heating of the container)/(a surface electric resistance value of the container at a time of starting the heating)≤5 up to a lapse of 288 hours from the time of starting the heating. The value (ratio) was, preferably, 3 or smaller. The value was, further preferably, 2.5 or smaller. The container is a container, when heated at 150° C. in the air, satisfying (a surface electric resistance value of the container having been changed by heating of the container)/(a surface electric resistance value of the container at a time of starting the heating)≤5 up to a lapse of 192 hours from the time of starting the heating. The value (ratio) was, preferably, 3 or smaller. The value was, further preferably, 2.5 or smaller.

The discoloration results from discoloration of the resin caused by heating. Basically, the heating deteriorates (changes in quality; modifies) the resin, thereby making a color of the container changed. The deterioration of the resin results from, for example, oxidation (oxidation promoted by heating) of the resin. The discoloration will also occur by a process other than heating treatment. The present invention will be applicable to such case.

The products are electric products (electronic products (parts) also fall under the scope of electric products).

The composition contains substantially no carbon black and no carbon fiber. "Contain substantially no carbon black and no carbon fiber" only means that they may be contained in so far as a color of carbon black or carbon fiber will not be an obstacle to the recognition of the color change of the container (resin composition). This is because, even if a minute amount of carbon black or carbon fiber is contained, there is no problem in so far as the color change of the container (resin composition) can be recognized. Even if a colorant other than carbon black or carbon fiber is contained, there is no problem in so far as a color of the colorant does not impede the recognition of the color change of the container (resin composition).

A preferable example of the resin includes a polyphenylene ether-based resin. The polyphenylene ether-based resin is a resin shown by, for example, the following General Formula [I].

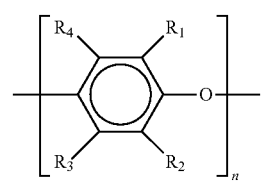

General Formula [I]

(In General Formula [I], $R_1$, $R_2$, $R_3$, and $R_4$, each independently, are a hydrogen atom, a halogen atom, a hydrocarbon group (e.g., alkyl group), a hydrocarbon oxy group (e.g., alkoxy group), and a halogenated hydrocarbon group (e.g., halogenated alkyl group) or a halogenated hydrocarbon oxy group (e.g., halogenated alkoxy group) having at least 2 carbon atoms between a halogen atom and a phenyl ring. For example, they are a monovalent substituent selected from a group which does not contain a tertiary-α carbon. n denotes a positive integer showing a polymerization degree. Preferably, n is an integer equal to or larger than 20. Further preferably, n is an integer equal to or larger than 50.)

The polyphenylene ether-based resin may be either one of a homopolymer and a copolymer of the polymer shown by the General Formula [I]. A preferable example of $R_1$ and $R_2$ is an alkyl group having 1 to 4 carbon atoms, and a preferable example of $R_3$ and $R_4$ is hydrogen atoms or an alkyl group having 1 to 4 carbon atom(s). For example, poly (2,6-dimethyl-1,4-phenylene) ether, poly (2,6-diethyl-1,4-phenylene) ether, poly (2,6-dipropyl-1,4-phenylene) ether, poly (2,6-dilauryl-1,4-phenylene) ether, poly (2,6-diphenyl-1,4-phenylene) ether, poly (2,6-dimethoxy-1,4-phenylene) ether, poly (2,6-diethoxy-1,4-phenylene) ether, poly (2,6-dichloro-1,4-phenylene) ether, poly (2,6-dibenzyl-1,4-phenylene) ether, poly (2,6-dibrome-1,4-phenylene) ether, poly (2-methyl-6-ethyl-1,4-phenylene) ether, poly (2-methyl-6-propyl-1,4-phenylene) ether, poly (2-methyl-6-phenyl-1,4-phenylene) ether, poly (2-ethyl-6-propyl-1,4-phenylene) ether, poly (2-ethyl-6-stearyloxy-1,4-phenylene) ether, poly (2-methoxy-6-ethoxy-1,4-phenylene) ether, poly (2-ethoxy-1,4-phenylene) ether, and poly (2-chloro-1,4-phenylene) ether are exemplified. As the polyphenylene ether copolymer, there is a copolymer having such a structure that alkyl-3-substituted phenol (e.g., 2,3,6-trimethylphenol) is partially contained in a repeating unit of the polyphenylene ether. Also, there is a copolymer in which a styrene compound is grafted to the polyphenylene ether-based resin. As the styrene compound, there are, for example, styrene, α-methylstyrene, vinyl toluene, and chlorostyrene. Also, there is a copolymer constituted of 2,6-dimethylphenol and 2,3,6-trimethylphenol. Further, there is a polyphenylene ether-based resin disclosed in JP1989-156A, JP1992-246461A, JP1995-228765A, JP2010-229348A, etc.

As the resin, the polyphenylene ether-based resin may be employed alone. A preferable example of the resin is a mixture (polymer alloy) of a polyphenylene ether-based resin and a styrenic resin. A preferable example of the styrenic resin was an acrylonitrile-styrenic resin. Examples of the acrylonitrile-styrenic resin include an acrylonitrile-styrene resin, an acrylonitrile-butadiene-styrene resin, an acrylonitrile-styrene-acrylic acid ester resin, an acrylonitrile-chlorinated polyethylene-styrene resin, and an acrylonitrile-ethylene-propylene-diene-styrene resin. The special preferable example of the acrylonitrile-styrenic resin is an acrylonitrile-styrene resin. The styrenic resin (acrylonitrile-styrenic resin) was contained, preferably, in an amount of from 4 pts·mass to 70 pts·mass with respect to the polyphenylene ether-based resin of 100 pts·mass. The styrenic resin was contained, more preferably, in an amount of 6 pts·mass or more. The styrenic resin was contained, further preferably, in an amount of 60 pts·mass or less.

In addition to the above listed resins, the following resins may be further contained. For example, an olefin-based resin, a carbonate-based resin, an acrylonitrile-based resin (e.g., an acrylonitrile-butadiene-acrylic acid ester resin, an acrylonitrile-methyl methacrylate resin, etc.) are exemplified. Such resins are contained, preferably, in an amount of 60 pts·mass or less with respect to the polyphenylene ether-based resin of 100 pts·mass.

The composition contains an antistatic agent. Specially, the composition contains an antistatic agent other than carbon black and carbon fiber. For the sake of easy recognition of the discoloration caused by heating, an antistatic agent of a color other than black and dark brown is preferred. The antistatic agent can be a surfactant. The surfactant may be any one of a cationic surfactant, an anionic surfactant, and an amphoteric surfactant. A preferable antistatic agent was a polymer type antistatic agent. This was because the polymer type antistatic agent had relatively large molecular weight (was relatively long), which makes the antistatic agent hard to ooze out from the resin composition. This can clarify why the polymer type is preferred. The polymer type antistatic agent will include also a prepolymer type antistatic agent. For example, the antistatic agent having molecular weight of 500 or larger is preferred (1000 or larger is more preferred). Examples of the polymer type antistatic agent include, but of course not limited to, polyether ester amides (e.g., a polyether ester amide constituted by a polyoxyalkylene adduct of bisphenol A (see JP1995-10989A)); a polyamide imide elastomer; a block polymer in which a bond unit of a polyolefin block and a hydrophilic polymer block has a repeated structure of from 2 to 50 (see U.S. Pat. No. 6,552,131); a block copolymer constituted by polyolefine and polyether; a graft polymer constituted by backbone chain polymer (polyamide) and branch polymer (block polymer constituted by polyalkylene ether and polyester); a copolymer constituted by alpha-olefin, maleic anhydride, and polyalkylene aryl ether; a polymer constituted by poly ethylene ether, isocyanate, and glycol; a copolymer constituted by carboxylic acid component, organic diisocyanate, and polyethylene glycol; a polyethylene oxide; a polyethylene oxide copolymer; a polyether ester; a polyether amide; a polyether ester amide; a partially crosslinked polyethylene oxide copolymer; an ionomer (e.g., a polymer having alkali metal salt of carboxylic acid, alkali metal salt of sulfonic acid, and quaternary ammonium salt in side chain); a graft polymer in which vinyl (or vinylidene) monomer (e.g., styrene sulfonic acid sodium) is grafted into a rubber copolymer constituted by alkylene oxide and conjugated diene compound; a polymer in which a polyphenylene ether resin is nucleus-substituted with a group such as a sulfonate group to form an ionic derivative; a composition constituted by polyether ester imide and carboxyl group-containing vinyl copolymer; a composition constituted by polyoxy alkylene group-containing alkyl amine, alkyl sulfonic acid sodium, and inorganic alkali metal saline; an acrylic acid ester-based elastomer; and a styrene-acrylic acid copolymer. The antistatic agent was contained, preferably, in an amount of from 3 pts·mass to 35 pts·mass with respect to the resin of 100 pts·mass. The antistatic agent was contained, more preferably, in an amount of 5 pts·mass or more. The antistatic agent was contained, further preferably, in an amount of 30 pts·mass or less. In the above-described cases, an excellent electrification prevention effect could be produced.

The container is used under a heated atmosphere. The container is used under an air atmosphere. Therefore, the resin constituting the container must be determined by taking its heat resisting property into consideration. In a case where an antistatic agent contained in the resin is a conductive (carbon-based and/or metal-based) filler, the HDT (deflection temperature under load; heat distortion temperature (heat deflection temperature) of the resin composition is higher than the HDT of the resin. In a case of the conductive filler, there must be the same problem found in the case of carbon black. When taking the above problem into consideration, a polymer type antistatic agent was preferred as the antistatic agent. But in a case where the polymer type antistatic agent was used, a container having a high HDT was not conventionally achieved. The inventors made a keen study about a container having the HDT of 130° C. or higher, they finally found that the polyphenylene ether-based resin was suitable as the resin. Further preferable resin was a resin composition containing the polyphenylene ether-based resin and the styrenic resin.

Hereinafter, specific embodiments will be described. Here, the present invention is not limited to only the embodiments as set forth below. It is therefore to be understood that, unless otherwise characteristics of the present invention is not impaired largely, various changes, modifications, and applications thereof should be construed as being included in the scope of the present invention.

EMBODIMENT

As the polyphenylene ether-based resin (PPE), PX-100F (manufactured by Mitsubishi Engineering-Plastics Corporation) was used.

As the acrylonitrile-styrenic resin (AS), PN-117 (manufactured by Taiwan Chimei Corporation) was used.

As the polycarbonate-based resin (PC), S2000 (manufactured by Mitsubishi Engineering-Plastics Corporation) was used.

As the polystyrene resin (PS), MW1C (manufactured by Toyo-Styrene Co., Ltd.) was used.

As the polypropylene-based resin (PP), R250G (manufactured by Prime Polymer Co., Ltd.) was used.

As the polymer type antistatic agent (polyether-type antistatic agent), Pelectron AS or Pelectron HS (manufactured by Sanyo Chemical Industries, Ltd.) was used.

As the colorant, an orange-color pigment (PPE3-5304 (manufactured by Shinei Color Kabushiki-Kaisha), an orange-color pigment (ES3-5542 (manufactured by Shinei Color Kabushiki-Kaisha), an orange-color dye (ES3-5541 (manufactured by Shinei Color Kabushiki-Kaisha), or carbon black (Ketjen black) was used.

Blending examples follow.

No. 1: PPE (60 pts·mass)+AS (30 pts·mass)+Pelectron AS (10 pts·mass)

No. 2: PPE (60 pts·mass)+AS (30 pts·mass)+Pelectron AS (10 pts·mass)+PPE3-5304 (0.4 pts·mass)

No. 3: PPE (60 pts·mass)+AS (30 pts·mass)+Pelectron AS (10 pts·mass)+ES3-5541 (0.1 pts·mass)

No. 4: PC (90 pts·mass)+Pelectron AS (10 pts·mass)

No. 5: PC (90 pts·mass)+Pelectron AS (10 pts·mass)+ES3-5542 (0.4 pts·mass)

No. 6: PC (90 pts·mass)+Pelectron AS (10 pts·mass)+ES3-5541 (0.1 pts·mass)

No. 7: PP (94 pts·mass)+Pelectron HS (6 pts·mass)

No. 8: PPE (70 pts·mass)+PS (22 pts·mass)+carbon black (8 pts·mass)

The compositions (No. 1 to No. 8) were charged into an injection molding machine to be subjected to the molten material injection molding. A molded plate constituted by those 8 compositions (No. 1 to No. 8) was obtained. The plate was subjected to hot air heating (heated air blowing) for 288 hours.

A color-difference meter (Color Meter NR555 (manufactured by Nippon Denshoku Industries Co., Ltd.)) was used to check a color of the plate before and after the hot air-drying treatment. The results are shown in Table-1A, B, C, D, E, and F.

A surface electric resistance measuring instrument (ST-4 (SIMCO JAPAN)) was used to check a surface electric resistance value (Rs (unit is Ω)) of the plate before and after the hot-air drying treatment. The results are shown in Table-2A, B, C, D, and E.

TABLE 1A (heating temperature: 135° C.)
Heating period (hrs)

| | | 0 | 48 | 96 | 192 | 288 |
|---|---|---|---|---|---|---|
| No. 1 | L* | 62.9 | 56.5 | 51.6 | 46.2 | 40.8 |
| | a* | 1.8 | 3.2 | 3.6 | 5.7 | 7.7 |
| | b* | 10.0 | 13.4 | 15.4 | 18.2 | 20.9 |
| | ΔE*ab | 0.0 | 7.4 | 12.6 | 19.0 | 25.3 |
| No. 2 | L* | 65.6 | 61.6 | 59.3 | — | 47.3 |
| | a* | 18.2 | 17.2 | 16.0 | — | 13.0 |
| | b* | 40.5 | 38.9 | 37.7 | — | 28.4 |
| | ΔE*ab | 0.0 | 4.8 | 7.3 | — | 22.8 |
| No. 3 | L* | 59.3 | 52.5 | 53.2 | — | 38.2 |
| | a* | 12.6 | 13.5 | 10.0 | — | 9.1 |
| | b* | 21.1 | 22.8 | 19.8 | — | 18.3 |
| | ΔE*ab | 0.0 | 7.1 | 6.8 | — | 21.6 |

TABLE 1B (heating temperature: 150° C.)
Heating period (hrs)

| | | 0 | 48 | 96 | 192 | 288 |
|---|---|---|---|---|---|---|
| No. 1 | L* | 61.5 | 47.6 | 38.7 | 28.4 | 18.1 |
| | a* | 1.7 | 4.0 | 7.7 | 8.4 | 9.0 |
| | b* | 8.8 | 14.5 | 18.0 | 14.5 | 11.0 |
| | ΔE*ab | 0.0 | 15.2 | 25.2 | 34.7 | 44.1 |
| No. 2 | L* | 66.6 | 54.6 | 46.4 | — | 31.3 |
| | a* | 18.6 | 14.8 | 14.0 | — | 11.7 |
| | b* | 41.0 | 33.0 | 31.6 | — | 21.5 |
| | ΔE*ab | 0.0 | 14.9 | 22.8 | — | 41.0 |
| No. 3 | L* | 60.7 | 49.1 | 40.3 | — | 22.5 |
| | a* | 12.4 | 11.7 | 10.3 | — | 8.6 |
| | b* | 22.5 | 22.8 | 18.4 | — | 11.9 |
| | ΔE*ab | 0.0 | 11.6 | 20.9 | — | 39.8 |

TABLE 1C (heating temperature: 120° C.)
Heating period (hrs)

| | | 0 | 48 | 96 | 192 | 288 |
|---|---|---|---|---|---|---|
| No. 4 | L* | 74.6 | 64.7 | 65.8 | 63.3 | — |
| | a* | −1.0 | −0.9 | 0.2 | −0.7 | — |
| | b* | 0.4 | 1.0 | 3.3 | 6.6 | — |
| | ΔE*ab | 0.0 | 10.0 | 9.4 | 12.9 | — |
| No. 5 | L* | 62.2 | 56.1 | 49.4 | 46.4 | — |
| | a* | 16.1 | 18.0 | 17.4 | 17.3 | — |

TABLE 1C-continued (heating temperature: 120° C.)
Heating period (hrs)

| | | 0 | 48 | 96 | 192 | 288 |
|---|---|---|---|---|---|---|
| | b* | 16.8 | 20.0 | 19.7 | 19.5 | — |
| | ΔE*ab | 0.0 | 7.0 | 13.1 | 16.0 | — |
| No. 6 | L* | 61.2 | 53.3 | 54.7 | 51.0 | — |
| | a* | 16.4 | 17.5 | 18.1 | 17.9 | — |
| | b* | 27.5 | 26.8 | 30.2 | 28.1 | — |
| | ΔE*ab | 0.0 | 8.0 | 7.2 | 10.3 | — |

TABLE 1D (heating temperature: 135° C.)
Heating period (hrs)

| | | 0 | 48 | 96 | 192 | 288 |
|---|---|---|---|---|---|---|
| No. 4 | L* | 74.0 | 57.1 | 50.5 | 47.5 | 47.5 |
| | a* | −1.3 | 0.8 | 2.3 | 3.1 | 4.1 |
| | b* | −0.2 | 4.5 | 8.6 | 9.0 | 9.7 |
| | ΔE*ab | 0.0 | 17.7 | 25.4 | 28.4 | 28.8 |

TABLE 1E (heating temperature: 135° C.)
Heating period (hrs)

| | | 0 | 48 | 96 | 192 | 288 |
|---|---|---|---|---|---|---|
| No. 7 | L* | 64.3 | 54.6 | 49.0 | 49.1 | 52.8 |
| | a* | −1.6 | 4.7 | 9.1 | 9.1 | 7.2 |
| | b* | 3.3 | 24.7 | 26.6 | 26.7 | 22.0 |
| | ΔE*ab | 0.0 | 24.3 | 29.9 | 29.9 | 23.7 |

In this case (when the plate was heated at 135° C.), there was large deformation (warpage) in the molded plate. Such plate is a defective as a tray to be used in heating treatment. The molded plate was discolored to a dark brown color (after 288 hours).

TABLE 1F (heating temperature: 135° C.)
Heating period (hrs)

| | | 0 | 48 | 96 | 192 | 288 |
|---|---|---|---|---|---|---|
| No. 8 | L* | — | — | — | — | — |
| | A* | — | — | — | — | — |
| | b* | — | — | — | — | — |
| | ΔE*ab | — | — | — | — | — |

*The resin composition of No. 8 contains carbon black, and thus color difference cannot be expressed. No change in color tone is seen.

TABLE 2A (heating temperature: 135° C.)
Heating period (hrs)

| | | 0 | 48 | 96 | 192 | 288 |
|---|---|---|---|---|---|---|
| No. 1 | Rs | 7.0E+8 | 7.5E+8 | 1.0E+9 | 2.2E+9 | 3.0E+9 |
| | Ratio | — | 1.1 | 1.4 | 2.1 | 4.3 |

In this case (when the tray is heated at 135° C.), an order of the surface electric resistance value is $10^8$-$10^9$ ($7.0\times10^8$-$3.0\times10^9$) up to a lapse of 288 hours of the heating time. There was not a large fluctuation of the surface electric resistance. Therefore, it is understood that, when heated at 135° C., the tray formed of the resin composition of No. 1 is not needed to be exchanged at least before a lapse of 288 hours. Further, the heating is continued for a long time, and an observation is to be made on a color of the tray at a time when (a surface electric resistance value after heating)/(a surface electric resistance value at a time of starting the heating) becomes 10. This contributes to the understanding that the tray can be used until the tray is discolored to the observed color.

TABLE 2B

| | | (heating temperature: 150° C.) Heating period (hrs) | | | | |
|---|---|---|---|---|---|---|
| | | 0 | 48 | 96 | 192 | 288 |
| No. 1 | Rs | 8.0E+9 | 9.0E+9 | 1.0E+10 | 1.4E+10 | 2.5E+11 |
| | Ratio | — | 1.1 | 1.3 | 1.8 | 31.2 |

In this case (when the tray is heated at 150° C.), an order of the surface electric resistance value is $10^9$-$10^{10}$ ($8.0\times10^9$-$1.4\times10^{10}$) up to a lapse of 192 hours of the heating time. When the heating is performed for 288 hours, an order of the surface electric resistance value is $10^{11}$. The surface electric resistance value becomes remarkably large when the heating time is between 192 hours and 288 hours. If the time at which the surface electric resistance value became remarkably large is checked as well as the color of the tray at the time is checked, it is understood that there is no large increase of the surface electric resistance value until the tray is discolored to such color. The tray can be used before the discoloration occurs.

TABLE 2C

| | | (heating temperature: 120° C.) Heating period (hrs) | | | | |
|---|---|---|---|---|---|---|
| | | 0 | 48 | 96 | 192 | 288 |
| No. 4 | Rs | 9.9E+10 | 4.7E+10 | 1.6E+11 | 3.5E+11 | — |
| | Ratio | — | 0.5 | 1.6 | 3.5 | — |

In this case (when the tray is heated at 120° C.), an order of the surface electric resistance value is $10^{10}$-$10^{11}$ ($4.7\times10^{10}$-$3.5\times10^{11}$) up to a lapse of 192 hours of the heating time. The surface electric resistance value would be remarkably large in the heating time between 192 hours and 288 hours. The time at which the surface electric resistance value increased largely is to be checked in detail as well as the color of the tray at the time is to be checked. Then, it becomes understood that there will be no large increase of the surface electric resistance value before the discoloration to the checked color. The tray can be used before the discoloration occurs.

TABLE 2D

| | | (heating temperature: 135° C.) Heating period (hrs) | | | | |
|---|---|---|---|---|---|---|
| | | 0 | 48 | 96 | 192 | 288 |
| No. 4 | Rs | 1.6E+11 | 2.3E+11 | 7.0E+11 | 3.5E+12 | 3.5E+12 |
| | Ratio | — | 1.4 | 4.4 | 21.8 | 21.8 |

In this case (when the tray is heated at 135° C.), the surface electric resistance value has already become 10 times or more at a time when the heating time of 192 hours have passed. An order of the surface electric resistance value is $10^{11}$ ($1.6\times10^{11}$-$7.0\times10^{11}$) up to a lapse of 96 hours of the heating time. The surface electric resistance value became remarkably large in the heating time between 96 hours and 192 hours. The time at which the surface electric resistance value became remarkably large is to be checked in detail as well as the color of the tray at the time is to be checked. Then, it becomes understood that there will be no large increase of the surface electric resistance value before the discoloration to the checked color. The tray can be used before the discoloration occurs.

TABLE 2E

| | | (heating temperature: 135° C.) Heating period (hrs) | | | | |
|---|---|---|---|---|---|---|
| | | 0 | 48 | 96 | 192 | 288 |
| No. 7 | Rs | 8.0E+9 | 3.5E+10 | 5.5E+10 | 4.0E+10 | 1.0E+11 |
| | Ratio | — | 4.3 | 6.9 | 5.0 | 12.5 |

*The ratios in Table-2A, B, C, D, and E are obtained by {(a surface electric resistance value after heating)/(a surface electric resistance value at a time of starting the heating)}.

In this case (when the tray is heated at 135° C.), an order of the surface electric resistance value is $10^9$-$10^{10}$ ($8.0\times10^9$-$5.5\times10^{10}$) up to a lapse of 192 hours of the heating time. In other words, there has been no large fluctuation of the surface electric resistance. At the time when the heating time of 288 hours have passed, an order of the surface electric resistance value is $10^{11}$ ($1.0\times10^{11}$). Up to a lapse of 192 hours of the heating time, a ratio of the surface electric resistance value is less than 10 times. Therefore, in a case of the tray formed of the resin composition of No. 7, when the tray is heated at 135° C., it is understood that the tray is not needed to be exchanged at least before 192 hours have passed. The molded plate, however, was deformed (warped) largely. The molded plate was a defective as a tray which is to be used in heating treatment. The molded plate was discolored to a dark brown color (after a lapse of 288 hours).

When comparison is made between a case where the resin constituting the tray is the PPE (No. 1) and a case where the resin constituting the tray is the PC (No. 4), the time reaching at the large increase of the surface electric resistance value of the tray is longer in the case of the PPE. Whereas the heating temperature of the resin composition (PC) of No. 4 is 120° C., the heating temperature of the resin composition (PPE) of No. 1 is 135° C. (150° C.). In view of Table-2A and Table-2B, as the heating temperature is higher, the time before increasing the surface electric resistance value of the tray is shorter. From this point, when the comparison is made between a case where the resin composition is the PPE and a case where the resin composition is the PC, it is understood that, even if the same antistatic agent is used, the PPE-made tray has a longer life span. The exchange frequency of the PPE-made tray can be lessened. The PC-made tray needs to be exchanged frequently.

REFERENCE CHARACTER LIST

1 tray (container)
2 housing chamber (storage section)
6 electronic parts (products)

The invention claimed is:
1. A method, comprising assessing an increase in electric resistance of a surface of a storage container and visually identifying discoloration of the surface, and moving electric product storage in the storage container to another storage container when the storage container is discolored to a defined color,
wherein the storage container and the another container comprise a resin composition and an antistatic agent.

2. The method according to claim 1, wherein the container is exchanged in such a manner that, based on preliminary investigated information on a relationship between a color and a surface electric resistance value at a time when the resin composition of the container is heated to cause discoloration of the resin composition, a time when the container is discolored to a defined color is considered to be a time when the surface electric resistance value of the container becomes greater than the allowable surface electric resistance value, and the container is exchanged at the time.

3. The method according to claim 1, wherein the container method is used when transporting to transport the electric products stored in the container, when inspecting characteristics of the electric products stored in the container, or when mounting the electric products stored in the container.

4. The method according to claim 1, wherein, at a time when (a surface electric resistance value of the container having been changed by heating of the container)/(a surface electric resistance value of the container when the heating is started)≤10, discoloration of the container caused by the heating is recognizable.

5. The method according to claim 1, wherein the discoloration results from discoloration of the resin composition caused by the heating.

6. The method according to claim 1 wherein the container is used heated at a temperature of 120° C. or higher.

7. The method according to claim 1, wherein the composition of the storage container contains substantially no carbon black and no carbon fiber.

8. The method according to claim 1, wherein the resin composition of the storage container comprises a polyphenylene ether-based resin.

9. The method according to claim 1, wherein the resin composition of the storage container further comprises a styrenic resin.

10. The method according to claim 9, wherein the styrenic resin is an acrylonitrile-styrenic resin.

11. The method according to claim 9, wherein the styrenic resin is present in an amount of from 4 pts·mass to 70 pts·mass with respect to the polyphenylene ether-based resin of 100 pt·mass.

12. The method according to claim 1, wherein the antistatic agent is a surfactant.

13. The method according to claim 1, wherein the antistatic agent is a polymer type antistatic agent.

14. The method according to claim 1, wherein the method comprising:
assessing color of the resin composition of the container,
comparing the assessed color of the resin composition to a previously determined color,
wherein
the previously determined color is a color when the resin composition is heated and a surface electrical resistance of the heated resin composition becomes 10 times a surface electrical resistance of the resin composition before heating,
the container is unsuitable for storing the electric product so that the container can be exchanged for another container, and
induced by heating is correlative to surface electric resistance.

* * * * *